(12) United States Patent
Wu

(10) Patent No.: US 10,749,838 B2
(45) Date of Patent: Aug. 18, 2020

(54) DNS SERVER AND CONFIGURATION LOADING METHOD, DNS NETWORK SYSTEM, AND DOMAIN NAME RESOLUTION METHOD AND SYSTEM

(71) Applicant: WANGSU SCIENCE & TECHNOLOGY CO., LTD., Shanghai (CN)

(72) Inventor: Xiaoying Wu, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/328,057

(22) PCT Filed: Feb. 28, 2018

(86) PCT No.: PCT/CN2018/077552
§ 371 (c)(1),
(2) Date: Feb. 25, 2019

(87) PCT Pub. No.: WO2018/188423
PCT Pub. Date: Oct. 18, 2018

(65) Prior Publication Data
US 2019/0190883 A1    Jun. 20, 2019

(30) Foreign Application Priority Data
Apr. 13, 2017    (CN) .......................... 2017 1 0238443

(51) Int. Cl.
*H04L 29/12*    (2006.01)
*H04L 29/06*    (2006.01)
(Continued)

(52) U.S. Cl.
CPC ...... *H04L 61/1511* (2013.01); *H04L 61/2007* (2013.01); *H04L 63/0227* (2013.01); *H04L 67/30* (2013.01); *H04L 61/3025* (2013.01)

(58) Field of Classification Search
USPC ........................................ 709/217, 203, 245
See application file for complete search history.

(56) References Cited

U.S. PATENT DOCUMENTS 7,313,631 B1 * 12/2007 Sesmun ............ H04L 29/12066
                                                    370/310
8,613,089 B1 * 12/2013 Holloway ........... H04L 63/0281
                                                    726/23
(Continued)

FOREIGN PATENT DOCUMENTS

CN    105704246 A    6/2016
CN    106375492 A    2/2017
(Continued)

OTHER PUBLICATIONS

The World Intellectual Property Organization (WIPO) International Search Report for PCT/CN2018/077552 dated May 24, 2018 5 Pages.

*Primary Examiner* — Jude Jean Gilles
(74) *Attorney, Agent, or Firm* — Anova Law Group, PLLC

(57) ABSTRACT

The present disclosure provides an DNS server and configuration loading method, an DNS network system, and a domain name resolution method and system. The present disclosure relates to the field of network communication technologies. The DNS server configuration loading method includes: dividing at least two NS partitions according to network carriers and/or regions; based on an IP address of an DNS server, obtaining an NS partition on which the DNS server has a traffic; from local records or database, filtering out domain name configuration information belonging to the
(Continued)

NS partition corresponding to the DNS server; and loading the filtered-out domain name configuration information into a memory of the DNS server. The present disclosure significantly reduces the amount of DNS configuration; increases the efficiency for the DNS server to load the domain name configuration information; reduces the loading time; and reduces the memory resource consumption of the DNS server.

15 Claims, 4 Drawing Sheets

(51) Int. Cl.
*H04L 29/08* (2006.01)
*G06F 5/16* (2006.01)

(56) References Cited

U.S. PATENT DOCUMENTS

| | | | | |
|---|---|---|---|---|
| 9,361,320 | B1 * | 6/2016 | Vijendra | G06F 16/20 |
| 2003/0093438 | A1 * | 5/2003 | Miller | H04L 29/12066 |
| 2005/0204039 | A1 * | 9/2005 | Douglis | H04L 29/12066 709/225 |
| 2007/0230678 | A1 * | 10/2007 | Bloebaum | H04M 3/02 379/211.01 |
| 2007/0237320 | A1 * | 10/2007 | Bloebaum | H04M 3/42102 379/142.15 |
| 2008/0281816 | A1 * | 11/2008 | Kim | G06F 16/955 |
| 2014/0059000 | A1 * | 2/2014 | Hosouchi | G06F 16/24532 707/609 |
| 2014/0372579 | A1 * | 12/2014 | Kikuchi | H04L 41/0806 709/222 |

FOREIGN PATENT DOCUMENTS

| | | |
|---|---|---|
| CN | 106953940 A | 7/2017 |
| EP | 2638689 A1 | 9/2013 |

\* cited by examiner

US 10,749,838 B2

DNS SERVER AND CONFIGURATION LOADING METHOD, DNS NETWORK SYSTEM, AND DOMAIN NAME RESOLUTION METHOD AND SYSTEM

CROSS-REFERENCE TO RELATED APPLICATIONS

This application is a national phase entry under 35 U.S.C. § 371 of International Application No. PCT/CN2018/077552, filed on Feb. 28, 2018, which claims priority to Chinese Patent Application No. 2017102384438, filed on Apr. 13, 2017, content of all of which is incorporated by reference in its entirety.

FIELD OF THE TECHNOLOGY

The present disclosure generally relates to the field of network communication technologies and, more particularly, relates to DNS servers and configuration loading methods, network systems, and domain name resolution methods and systems.

BACKGROUND OF THE TECHNOLOGY

The response time of a Domain Name System (DNS) is often in the millisecond level. Thus, the regular DNS software, such as bind, may load the DNS configuration into the memory to respond to requests faster.

Currently, the entry DNS of the Content Delivery Network (CDN) returns the nearest server to the visitor according to the Internet Protocol (IP) of the visitor or the client IP carried by the ends-client-subnet (ECS). Thus, each domain name has a configuration in each view (or region).

However, during performing the embodiments of the present invention, the inventor finds that the existing technologies at least have the following issues.

Currently, the amount of domain configuration of the DNS server of the CDN needs to reach a product of domain number and view number (i.e., domain number*view number), and the configuration amount is significantly large. Loading all the DNS configurations of the CDN, on one hand, consumes a large quantity of memory resource. On the other hand, CND nodes are switched frequently, loading is frequent, the configuration amount is large, and the loading time is long.

BRIEF SUMMARY OF THE DISCLOSURE

To solve the issues in the existing technologies, embodiments of the present disclosure provide a DNS server and a method for loading DNS server configuration, a DNS network system, a domain name resolution method and system. The technical solution may include the followings.

In a first aspect, embodiments of the present disclosure provide a method for a DNS server, and the method includes: dividing at least two NS (name server) partitions according to network carriers and/or regions; based on an IP address of the DNS server, obtaining an NS partition on which the DNS server has a traffic; from local records or a local database, filtering out domain name configuration information belonging to the NS partition corresponding to the DNS server; and loading the filtered-out domain name configuration information into a memory of the DNS server.

Optionally, when any domain name configuration information in the local records or local database is changed, determining whether the changed domain name configuration information belongs to the NS partition corresponding to the DNS server; and when it is determined that the changed domain name configuration information belongs to the NS partition corresponding to the DNS server, loading the changed domain name configuration information in the memory of the DNS server.

In a second aspect, embodiments of the present disclosure provide a DNS server. The DNS server includes: an acquisition module configured to, based on an IP address of the DNS server, obtain a name server (NS) partition on which the DNS server has a traffic, where the NS partition is an NS partition divided according to carriers and/or regions; a filtering module configured to, from local records or a local database, filter out domain name configuration information belonging to the NS partition corresponding to the DNS server; and a loading module configured to load the filtered-out domain name configuration information into a memory of the DNS server.

Optionally, the DNS server further includes: a determining module, wherein the determining module is configured to, when any domain name configuration information in the local records or local database is changed, determine whether the changed domain name configuration information belongs to the NS partition corresponding to the DNS server; and wherein the loading module is further configured to, when it is determined that the changed domain name configuration information belongs to the NS partition corresponding to the DNS server, load the changed domain name configuration information in the memory of the DNS server.

In a third aspect, embodiments of the present disclosure provide a DNS network system. The DNS network system includes the disclosed DNS server.

In a fourth aspect, embodiments of the present disclosure provide a domain name resolution method. The domain name resolution method includes: receiving a domain name resolution request using the DNS server; determining whether domain name configuration information corresponding to the domain name resolution request is stored in the memory of the DNS server; and when it is determined that the domain name configuration information corresponding to the domain name resolution request is stored in the memory of the DNS server, resolving the domain name resolution request according to the domain name configuration information Optionally, the domain name resolution method further comprises: when it is determined that the domain name configuration information corresponding to the domain name resolution request is not stored in the memory of the DNS server, filtering out the domain name configuration information corresponding to the domain name resolution request from local records or database; and resolving the domain name resolution request according to the filtered-out domain name configuration information.

Optionally, the step for determining whether domain name configuration information corresponding to the domain name resolution request is stored in a memory of the DNS server further includes: matching an egress IP address of a local DNS server with at least one IP address in an IP database and determining an NS partition corresponding to the egress IP address; and determining whether domain name configuration information of the domain name resolution request is stored in the memory of the DNS server according to the NS partition and the domain name resolution request.

On the fifth aspect, the present disclosure also provides a domain name resolution system. The domain name resolution system includes: a receiving module configured to receive a domain name resolution request using the DNS server; and a first processing module configured to determine whether domain name configuration information corresponding to the domain name resolution request is stored in the memory of the DNS server and, when the domain name configuration information corresponding to the domain name resolution request is stored in the memory of the DNS server, to resolve the domain name resolution request according to the domain name resolution request.

Optionally, the domain name resolution system further includes: a second processing module configured to, when the domain name configuration information corresponding to the domain name resolution request is stored in a memory of the DNS server, filter out the domain name configuration information corresponding to the domain name resolution request in the local records and/or database, and resolve the domain name resolution request according to the filtered-out domain name configuration information.

The technical solutions provided by embodiments of the present disclosure may have the following advantageous effects.

With the DNS server and method for loading the DNS server configuration, the DNS network system, the domain name resolution method and system, the NS partition served by the corresponding DNS server may be obtained according to the IP address of the DNS server; and the domain name configuration information of the NS partition belonging to the DNS server may be filtered out. Only the domain name configuration information corresponding to the NS partition may be stored in the memory of the DNS server. Thus, the memory of the DNS server may not need to be loaded with the domain name configuration information of the other NS partitions. Thus, the present disclosure may significantly reduce the amount of domain name configuration; increase the efficiency for the DNS server to load the domain name configuration information; reduces the loading time; and reduces the memory resource consumption of the DNS server.

BRIEF DESCRIPTION OF THE DRAWINGS

In order to more clearly illustrate the technical solutions in the embodiments of the present disclosure, the accompanying drawings for describing the embodiments are briefly described in the followings. Apparently, the drawings in the following description are only some embodiments of the present disclosure. For those of ordinary skill in the art, other drawings can be derived from these drawings without creative efforts.

DETAILED DESCRIPTION OF THE PRESENT DISCLOSURE

Reference will now be made in detail to exemplary embodiments of the disclosure, which are illustrated in the accompanying drawings. Wherever possible, the same reference numbers will be used throughout the drawings to refer to the same or like parts.

Embodiments of the present disclosure provide a method for loading a DNS server configuration. The execution entity of the method is the DNS server in the CDN. The DNS server configuration loading method may be applied in the registration of the DNS or in updating the domain name configuration information. The domain name configuration amount in the memory of the DNS server may be significantly reduced. The time for loading the domain name configuration information may be shortened; and the efficiency may be substantially high. The consumption of the memory source of the DNS server may be substantially low. Thus, the running speed and the running state of the DNS server may be improved.

Figure 1:
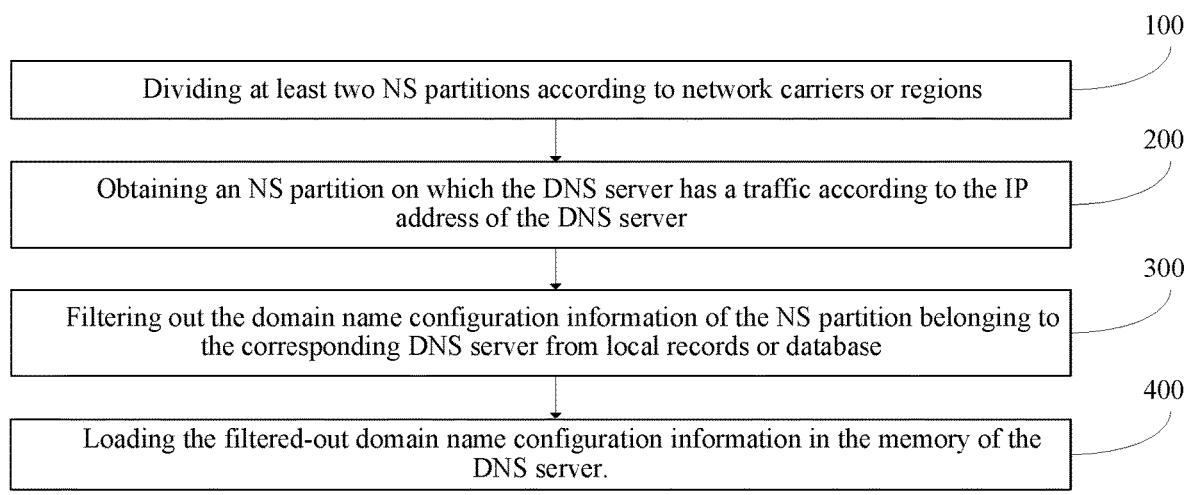
FIG. 1 is a flow chart of an exemplary DNS server configuration loading method consistent with various disclosed embodiments.
Figure 2:
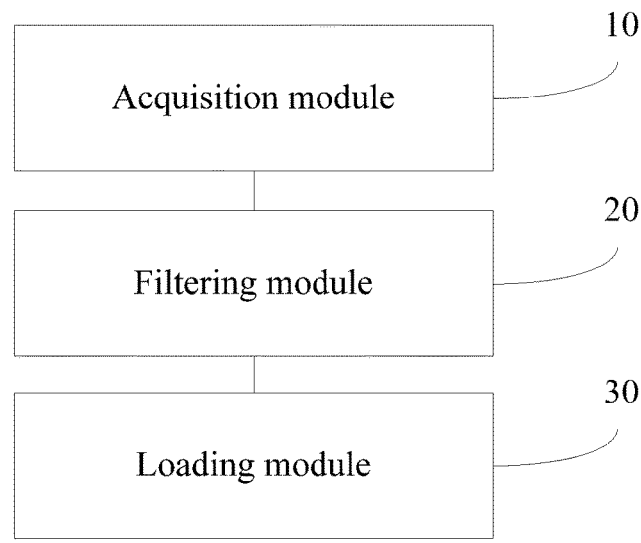
FIG. 2 is an exemplary DNS server consistent with various disclosed embodiments.

The processing flows illustrated in FIG. 1 and FIG. 2 are described in detail, in conjunction with the following specific embodiments, including the followings.

Step 100, at least two Name Server (NS) partitions may be divided according to network carriers and/or regions.

An NS record may be used to identify which DNS sever to perform the resolution of the domain name request. Referring to the NS configuration information in Table 2, in one embodiment, the DNS server may be configured according to the NS partitions (NS and View). Each NS partition may correspond to one DNS server. The DNS server may be in charge of resolving the domain name requests corresponding to the NS partition. The network carriers may include China Telecom, China Netcom, or China Mobile, etc. and, when performing NS partitions according to network carriers, each network carrier may be divided as one NS partition. For example, the China Telecom may correspond to one NS partition dx; and the China Netcom may correspond to one NS partition wt. Also, several network carriers may be divided into one NS partition and other network carriers may be divided into another NS partition to form two NS partitions. The regions may be the regions where the administrative regions locate, such as Beijing region, Shanghai region and Hongkong region, etc. When the NS partitions are performed according to regions, each administrative region may be divided into one NS partition, or multiple administrative regions may be divided into one NS partition.

In the present embodiment, the network carriers and the regions may be used together to divide the NS partitions. For example, the China Telecom in the Beijing region with the NS of ns1.aaa.com may be divided as an NS partition dx-bj. Then, the China Netcom in the Beijing region with the NS of ns1.aaa.com may be divided as another NS partition wt-bj. Then, all other network carriers in the Beijing region with the NS of ns1.aaa.com may be divided as another NS partition; and the China Telecom in the Tianjin region with the NS of ns2.aaa.com may be divided as a NS partition dx-tj, and so on and so forth.

It should be noted that the region in the present embodiment may be an NS partition obtained by dividing a sub-administrative region of the previously mentioned region.

For example, each county level administrative region of Shanghai may be divided as an NS partition. For example, the Pudong district of Shanghai may be divided as one NS partition; and the Puxi district of Shanghai may be divided as one NS partition. A few sub-administrative regions may also be divided as one NS partition. For example, the Pudong district and the Puxi district of Shanghai may be divided as one NS partition; and other regions of Shanghai may be divided as another NS partition.

In one embodiment, the specific region (view) of each specific carrier may have a corresponding IP range to form an IP database. For example, as shown in Table 1, each view (region) may have a corresponding IP range. As shown in Table 1, the view of dx-bj (the Telecom at Beijing) may have the corresponding IP range of 1.1.1.1-1.1.1.255; and the view of wt-bj (the Netcom at Beijing) may have the corresponding IP range of 1.1.3.1-1.1.3.255.

TABLE 1

IP database

| IP Range | View (region) |
|---|---|
| 1.1.1.1~1.1.1.255 | dx-bj |
| 1.1.2.1~1.1.2.255 | dx-tj |
| 1.1.3.1~1.1.3.255 | wt-bj |
| ... | ... |

The IP database may be stored in the DNS server as basic information.

Step 200, based on the IP address of the DNS server, NS partitions on which the DNS server has a traffic may be obtained.

In one embodiment, the traffic is the network service visiting traffic on a certain network carrier and/or region. The DNS server may obtain the NS partition served by the DNS server according its own IP address and the traffic generated when the DNS server performs the network service. In particular, when it needs to load the configuration information of the NS partition on which the DNS server has a traffic, the IP address of the DNS server may be compared with the NS configuration table (as shown in Table 2) to determine the NS partition served by the DNS server to obtain the corresponding NS partition. If the IP address of a certain DNS server is 1.1.1.1, the region served by the DNS server may be determined to be the Telecom of Beijing. That is, the corresponding NS partition is ns1.aaa.com, dx-bj. If the IP address of a certain DNS is 6.6.6.6, the region served by the DNS server may be determined to be the Telecom of Tianjin. That is, the corresponding NS partition may be ns2.aaa.com, dx-tj.

If there are a plurality of NS partitions, the DNS server corresponding to each NS partition of the plurality of NS partitions may be unique, as shown in Table 2.

TABLE 2

NS configuration information

| NS | View | IP (IP of the current DNS server) |
|---|---|---|
| ns1.aaa.com | dx-bj | 1.1.1.1 |
| ns1.aaa.com | wt-bj | 2.2.2.2 |
| ... | | |
| ns2.aaa.com | dx-tj | 6.6.6.6 |
| ns2.aaa.com | wt-tj | 7.7.7.7 |
| ... | | |

Step 300, the domain name server configuration information of the NS partition belonging to the corresponding DNS server in the local records or database may be filtered out.

The local records or database may store all the domain name configuration information (as shown in Table 3). The DNS server may need to load the domain name configuration information during registration or updating the domain name configuration information. It may first update the new domain name configuration information in the local records or database when there is a domain name information update.

In one embodiment, the domain name server configuration information of the NS partition belonging to the corresponding DNS server in the local records or database may be filtered out. In particular, the A record and domain name belonging to the NS partition may be determined according to the NS partition corresponding to the DNS server in the local records or database.

For example, in Step 200, the NS partition served by the DNS server with the IP address of 1.1.1.1 may be determined as dx-bj, thus in the Step 300, the domain name configuration information of dx-bj belonging to the NS partition (with view corresponding to dx-bj) of the DNS server in the local records or database may be filtered out, such as the domain name 163.aaa.com and the corresponding A record 202.101.98.55, the domain name 126.aaa.com and the corresponding A record and other domain name with views corresponding to dx-by and the corresponding A record.

TABLE 3

Domain name configuration information

| DN (domain name) | View | IP (A Record) |
|---|---|---|
| 163.aaa.com | dx-bj | 202.101.98.55 |
| 163.aaa.com | dx-tj | ... |
| 163.aaa.com | wt-bj | |
| ... | ... | |
| 126.aaa.com | dx-bj | ... |
| 126.aaa.com | dx-tj | ... |
| 126.aaa.com | wt-bj | |
| ... | ... | |

Step 400, the filtered-out domain name configuration information may be loaded into the memory of the DNS server.

In the present embodiment, the filtered-out domain name configuration information may be loaded into the memory of the DNS server. By doing so, when the user belonging to the NS partition corresponding to the DNS server sends a request, the DNS server may directly return the feedback to the user according to the domain name configuration information stored in the memory. The DNS server may only serve specific regions of the carrier having a desired resolution result; and the response speed to the request may be increased. Other small amount of domain name configuration information not in the filtered region may be returned back to the requester by filtering the domain name configuration from the local records or database.

For example, the filtered-out domain name configuration information with all views corresponding to dx-bi, such as the domain name 163.aaa.com and the corresponding A record 202.101.98.55, the domain name 126.aaa.com and the corresponding A record and the domain name with the view corresponding to dx-bj and the corresponding A record, may be loaded into the memory of the DNS server with the IP address of 1.1.1.1. Similarly, according to the NS configuration information of FIG. 2, the NS partition served by the DNS server with the IP address of 2.2.2.2 may be wt-bj, all the domain name configuration information of the domain name with the view of wt-bj filtered-out from the local records or database may be loaded into the memory of the DNS server with the IP address of 2.2.2.2.

Optionally, the DNS server configuration loading method provided be present embodiment may further include:

when the domain name server configuration information in the local records or database is changed, determining whether changed domain name configuration information belongs to the NS partition corresponding to the DNS server.

In one embodiment, when the domain name server configuration information in the local records or database is changed, whether the changed domain name configuration information belongs to the NS partition corresponding to the DNS server may be determined.

When the changed domain name configuration information belongs to the NS partition corresponding to the DNS server, the changed domain name configuration information may be loaded into the memory of the DNS server.

In one embodiment, when the changed domain name configuration information belongs to the NS partition corresponding to the DNS server, the changed domain name configuration information may be loaded into the memory of the DNS server to replace the previous domain name configuration information. Thus, the updating of the domain name configuration information may be accomplished. Comparing with the existing technologies that the DNS server is loaded with all the configuration information, the memory of the DNS server in the present embodiment may only load the domain name configuration information corresponding to the NS partition on which the DNS server has a traffic. When one or more pieces of domain name configuration information needs to be changed, because the amount of configuration information in the memory of the DNS server is reduced, searching the domain name configuration information needed to be changed may be faster, the time for changing the configuration may be significantly reduced; and the efficiency for loading the configuration may be increased. When the changed domain name configuration information does not belong to the NS partition corresponding to the DNS server, the changed domain name configuration information does not need to be loaded in the memory of the DNS server. Thus, the efficiency for the DNS server to load the domain name configuration information may be increased; and it may not need to search all the domain name configuration information corresponding to the DNS server when one piece domain name configuration information is changed.

In the DNS server configuration loading method provided by the present disclosure, the NS partition corresponding to the DNS server may be obtained according to the IP address of the DNS server; and the domain name configuration information belonging to the NS partition served by the DNS server may be filtered-out. The memory of the filtered DNS server may only be loaded with the domain name configuration information corresponding to the NS partition. Thus, the memory of the DNS server may not need to load the domain name configuration information of other NS partitions. Accordingly, the amount of domain name configuration in the DNS server may be significantly reduced; and the efficiency for the DNS server to load the domain name configuration information may be increased. Further, the loading time may be reduced; and the consumption of the memory resource of the DNS server may be reduced.

Based on the similar technical concept, the present disclosure also provides a DNS server. As shown in FIG. 2, the DNS server may include:

an acquisition module 10, configured to obtain the NS partition on which the DNS server has a traffic according to the IP address of the DNS server;

a filtering module 20, configured to filter out the domain name configuration information of the NS partition belonging to the corresponding the DNS server in the local records or database; and a loading module 30, configured to load the filtered-out domain name configuration information to the memory of the DNS server.

Figure 3:
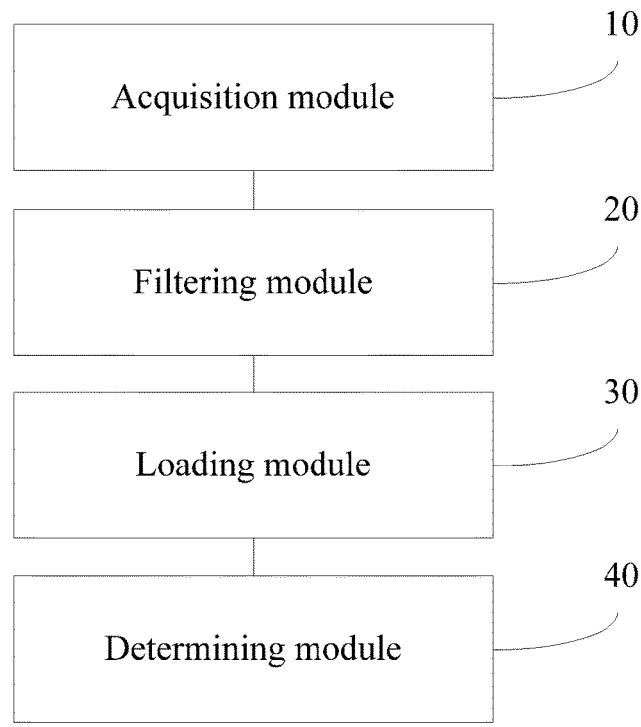
FIG. 3 is another exemplary DNS server consistent with various disclosed embodiments.

As shown in FIG. 3, optionally, the DNS server may also include a determining module 40.

The determining module 40 may be configured to determine whether the changed domain name configuration information belongs to the NS partition corresponding to the DNS server when the domain name configuration information in the local records or database is changed.

The loading module 30 may also be used to load the changed domain name configuration information into the memory of the DNS server when the changed domain name configuration information belongs to the NS partition corresponding to the DNS partition.

For the present disclosed DNS server, the method for loading its configuration may be the DNS server configuration loading method corresponding to that in FIG. 1. Similarly, the NS partition corresponding to the DNS server may be obtained by the acquisition module 10 according to the IP address of the DNS server; the domain configuration information of the NS partition belonging to the DNS server may be filtered-out by the filtering module 20; and the domain name configuration information of the corresponding NS partition may be loaded into the memory of the DNS server by the loading module 30. Thus, The DNS server may not need to be loaded with the domain name information of other partitions. Thus, the domain name configuration amount in the DNS server may be significantly reduced; and the efficiency for the DNS server to load the domain name configuration information may be increased. Further, the loading time may be reduced; and the consumption of the memory resource of the DNS server may be reduced.

Based on the similar technical concept, the present disclosure also provides a DNS network system including the previously described domain name server.

The DNS network system provided by the present disclosure may include a plurality of previously described DNS servers. The plurality of previously described DNS servers may serve a plurality of NS partitions. When each of the plurality of previously described DNS servers loads or changes the domain name configuration information, its memory may only load the domain name information of a specific domain. Thus, the configuration amount of each DNS server may be reduced; the efficiency for each DNS server to load the domain name configuration information may be increased. Further, the loading time may be reduced; and the consumption of the memory resource of each DNS server may be reduced.

Figure 4:
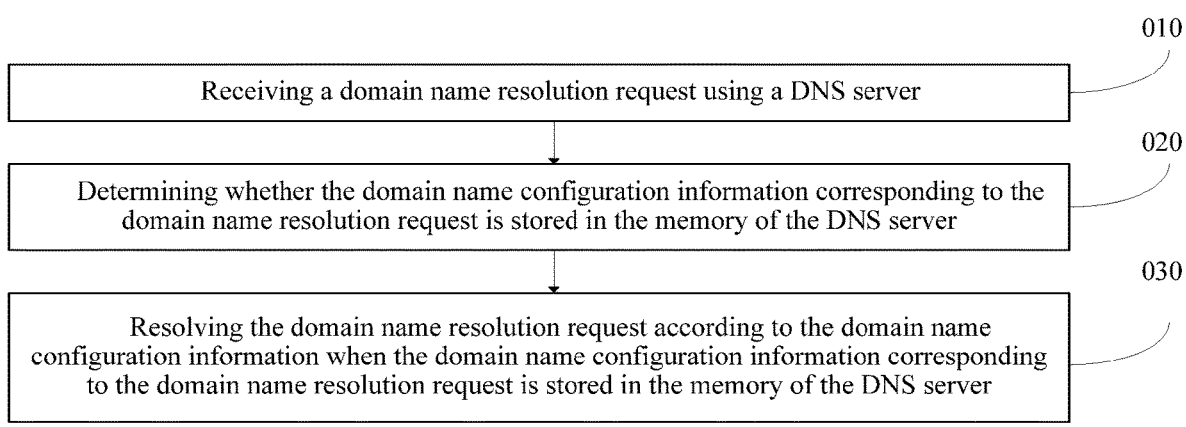
FIG. 4 is a flow chart of an exemplary domain name resolution method consistent with various disclosed embodiments.

Based on the similar technical concept, the present disclosure also provides a domain name resolution method. The domain name resolution method may be applied to the previously described DNS servers and DNS network system. As shown in FIG. 4, the domain name resolution method may include following steps.

Step 010, the previously described DNS server receives a domain name resolution request.

In one embodiment, the previously described DNS server may receive the domain name resolution request sent by a user (e.g., a user terminal) or a local DNS server. The DNS server may need to check the IP address of the user by searching the IP database in the previously described Table 1 to the region (View) to which the egress IP address of the user or the DNS server belongs. For example, if the egress IP address of a public network DNS server is 1.1.1.2, the egress IP address of the user or the local DNS server may be determined as belonging to the view of dx-bj. If the egress IP address of a public network DNS server is 1.1.3.2, the egress IP of the user or the local DNS server may be determined as belonging to the view of wt-bj.

Step 020, the domain name configuration information corresponding to the domain name resolution request may be determined if it is stored in the memory of the DNS server. Step 030, when the configuration information corresponding to the domain name resolution request is stored in the memory of the DNS server, the domain name resolution request may be resolved according to the configuration information.

In one embodiment, when the egress IP address of the user or the local DNS server belongs to the NS partition corresponding to the DNS server, it can be determined that the domain name configuration information corresponding to the domain name resolution request sent by the user is stored in the memory of the DNS server. When the domain name configuration information corresponding to the domain name resolution request is stored in the memory of the DNS server, the domain name resolution request may be resolved according to the domain name configuration information. That is, the A record of the requested domain name may be returned to the user.

Figure 5:
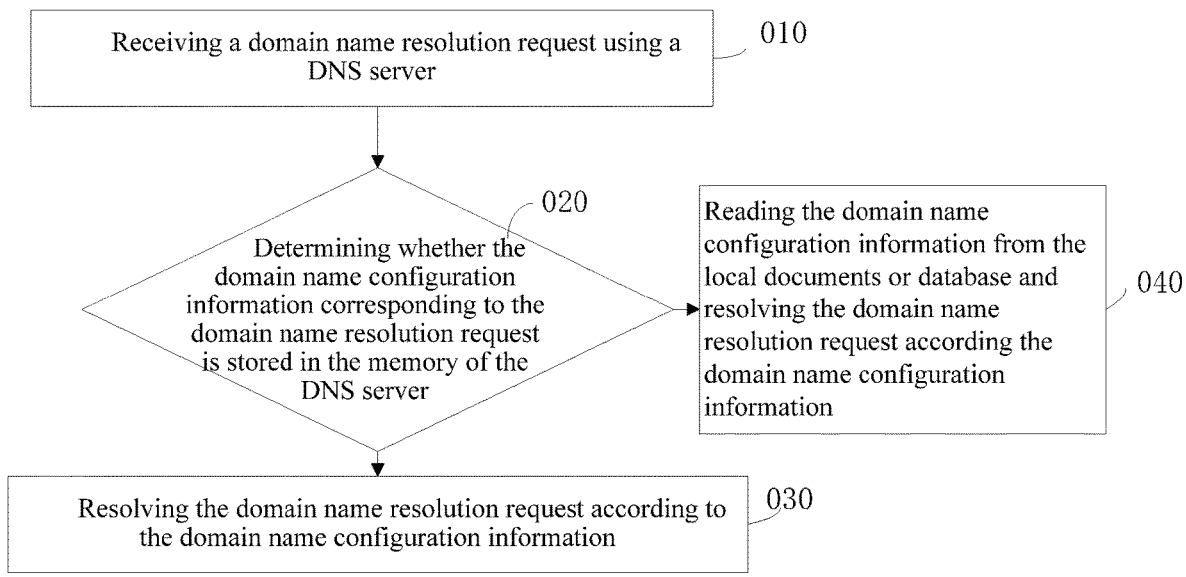
FIG. 5 is a flow chart of another exemplary domain name resolution method consistent with various disclosed embodiments.

Optionally, as shown in FIG. 5, the domain name resolution method provided by the present embodiment may also include:

Step 040, when the domain name configuration information corresponding to the domain name resolution request is not stored in the memory of the DNS server, the configuration information corresponding to the domain name resolution request may be filtered out from the local records or database; and the domain name resolution request may be resolved according to the configuration information.

In one embodiment, when the IP address of the user does not belong to the NS partition of the DNS server, it may be determined that the domain name configuration information corresponding to the domain name resolution request sent by the user is not stored in the memory of the DNS server. At this time, the configuration information corresponding to the domain name resolution request needs to be filtered out from the local records or database; and the domain name resolution request may be resolved according to the filtered-out configuration information, and returned to the user.

It should be noted that, when the system has a malfunction, for example, when the IP address of the user belongs to the NS partition corresponding to the DNS server, but the domain name configuration information corresponding to the domain name resolution request is not stored in the memory of the DNS server, the configuration information corresponding to the domain name resolution request may be filtered out from the local records or database and the domain name resolution request may be resolved according to the filtered-out configuration information and returned to the user. At this time, the DNS server may need to report the malfunction; and store the configuration information in the memory.

Optionally, in Step 020, the process of determining whether the configuration information corresponding to the domain name resolution request is stored in the memory of the DNS server may also include:

matching the egress IP of the local DNS server with at least one IP address in the IP database; and determining the NS partition corresponding to the egress IP. According to the NS partition and the domain name resolution request, it may be determined whether the configuration information requested by the domain name resolution request is stored in the memory of the DSN server.

In one embodiment, when the egress IP address of the local DNS server (i.e., the IP address of the user) matches with at least one IP address in the IP database, the NS partition to which the IP address of the user belongs may be determined.

For example, the egress IP address of the user or the DNS server is 1.1.1.2, the to-be-resolved domain name is 163.aaa.com, the DNS server may search the IP database (as shown in Table 1) according to the egress IP address of the user or the local DNS server 1.1.1.2 and the user may be determined as the user having the view (domain) of dx-bj. Then, according to the NS configuration information in the Table 2, the DNS server for serving the View of dx-bj may be determined as the DNS server having the IP address of 1.1.1.1. Then, it can be determined that the domain name configuration information corresponding to the domain name resolution request sent by the user should be stored in the memory of the DNS server having the IP address of 1.1.1.1. The DNS server having the IP address of 1.1.1.1 may directly return the A record of 201.101.98.55 of the domain name of 163.aaa.com stored in the memory to the user; and the domain name resolution may be completed.

In the domain name resolution method provided by the present embodiment, by using the above-described DNS server, the domain name resolution request may be rapidly returned to the user. Thus, the efficiency of the domain name resolution may be improved.

Figure 6:
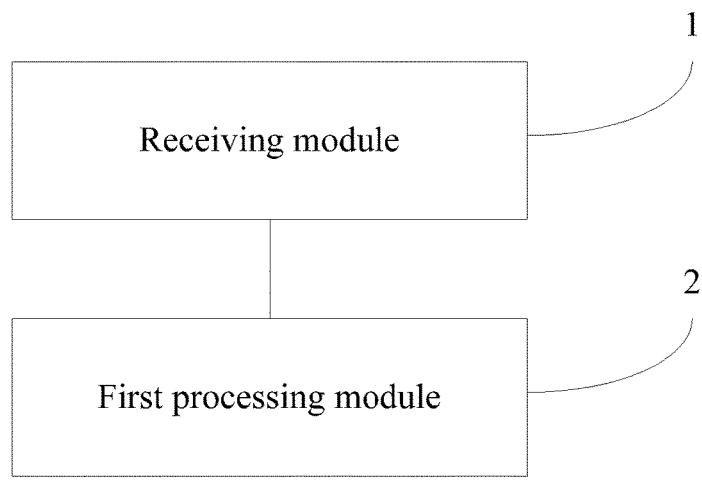
FIG. 6 illustrates an exemplary domain name resolution system consistent with various disclosed embodiments.

Based on the similar technical concept, embodiments of the present disclosure also provide a domain name resolution system. As shown in FIG. 6, the domain name resolution system may include:

A receiving module 1, configured to receive a domain name resolution request using the previously described DNS server; and A first processing module 2, configured to determine whether the configuration information corresponding to the domain name resolution request is stored in the memory of the DNS server. When the configuration information corresponding to the domain name resolution request is stored in the memory of the DNS server, the domain name resolution request may be resolved according to the configuration information.

Figure 7:
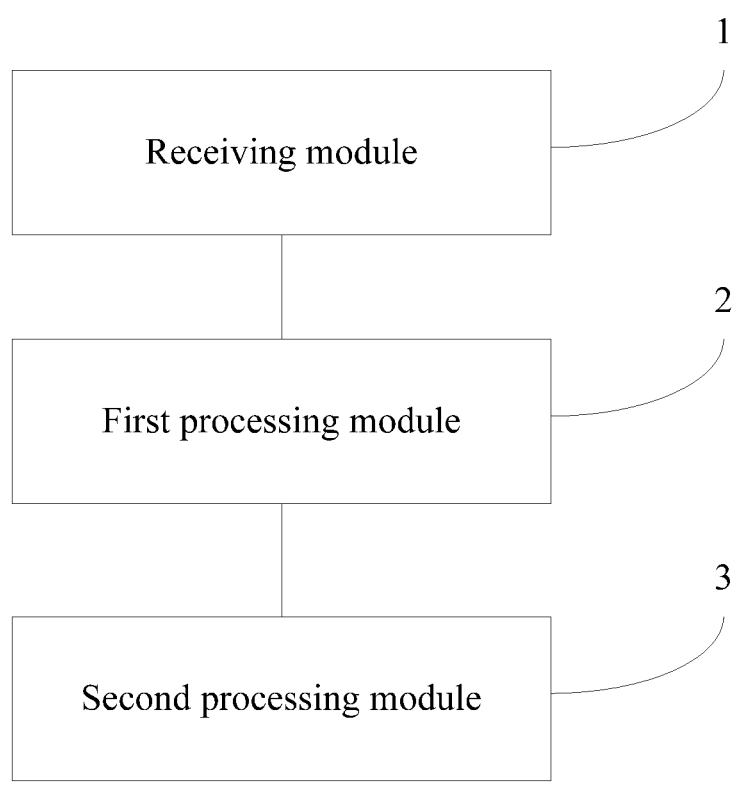
FIG. 7 illustrates another exemplary domain name resolution system consistent with various disclosed embodiments.

Optionally, as shown in FIG. 7, the domain name resolution system provided by the present embodiment may also include:

A second processing module 3, configured to, when the configuration information corresponding to the domain name resolution request is not stored in the memory of the DNS server, filter out the configuration information corresponding to the domain name resolution request from the local records or database and resolve the domain resolution request according to the filtered-out configuration information.

Thus, the domain resolution system provided by the present embodiment may be able to rapidly feedback the domain name resolution request using the previously described DNS server.

By using the above described embodiments, those skilled in the art may clearly understand that the embodiments may be implemented by software and a necessary general hardware platform, such as a hardware processor coupled with memory and other peripherals, and may also be implemented by hardware. Based on such understanding, the major portion of the above technical solutions may be embodied in a software product. The software product may be stored in a computer-readable storage medium, such as a ROM/RAM, magnetic disk, optical disk, etc. The software product may include a plurality of commands to enable a computer (e.g., a personal computer, a server, or a network equipment, etc.) to execute the above embodiments or portions of the embodiments.

Further, the term "comprising" or any other variation thereof is intended to cover a non-exclusive inclusion, such that the product or system comprises a series of elements, not only comprise those elements, but also comprising other elements not explicitly listed, or further includes elements of the goods or inherent in the system. Without more constraints, the wording defined by "include a . . . " does not exclude the existence of additional identical elements in the element having goods or systems.

The description of the embodiments shows and describes several preferred embodiments of the present disclosure, as previously discussed, it should be understood that the disclosure is not limited to the forms disclosed herein and should not be considered as excluding other embodiments. It may be used in various other combinations, modifications, and environments, and can be contemplated within the scope of the disclosure described herein, or make changes to the above teachings in skill or knowledge of the relevant art. The modifications and variations carried out by the skilled person shall fall within the scope of the appended claims of the disclosure without departing from the spirit and scope of the disclosure.

The embodiments of the apparatus described above is merely illustrative, the units described separately may be or may not be physically separate, parts displayed as units may be or may not be physical units. That is, they may be located in one place, or may be distributed to multiple network units. One can select some or all of the modules according to actual needs to achieve the objective of the embodiments. Those of ordinary skilled in the art should be able to understand and implement the embodiments without creative efforts.

What is claimed is:

1. A method for a DNS (domain name system) server, comprising:
   dividing at least two NS (name server) partitions according to network carriers and/or regions;
   based on an IP address of the DNS server, obtaining an NS partition on which the DNS server has a traffic;
   from local records or a local database, filtering out domain name configuration information belonging to the NS partition corresponding to the DNS server; and
   loading the filtered-out domain name configuration information into a memory of the DNS server.

2. The method according to claim 1, further comprising:
   when any domain name configuration information in the local records or local database is changed, determining whether the changed domain name configuration information belongs to the NS partition corresponding to the DNS server; and
   when it is determined that the changed domain name configuration information belongs to the NS partition corresponding to the DNS server, loading the changed domain name configuration information in the memory of the DNS server.

3. The method according to claim 2, further comprising:
   receiving a domain name resolution request;
   determining whether domain name configuration information corresponding to the domain name resolution request is stored in the memory of the DNS server; and
   when it is determined that the domain name configuration information corresponding to the domain name resolution request is stored in the memory of the DNS server, resolving the domain name resolution request according to the domain name configuration information.

4. The method according to claim 3, further comprising:
   when it is determined that the domain name configuration information corresponding to the domain name resolution request is not stored in the memory of the DNS server, filtering out the domain name configuration information corresponding to the domain name resolution request from local records or database; and
   resolving the domain name resolution request according to the filtered-out domain name configuration information.

5. The method according to claim 3, wherein determining whether domain name configuration information corresponding to the domain name resolution request is stored in the memory of the DNS server further comprises:
   matching an egress IP address of a local DNS server with at least one IP address in an IP database and determining an NS partition corresponding to the egress IP address; and
   determining whether domain name configuration information of the domain name resolution request is stored in the memory of the DNS server according to the NS partition and the domain name resolution request.

6. A domain name system (DNS) server, comprising:
   an acquisition module configured to, based on an IP address of the DNS server, obtain a name server (NS) partition on which the DNS server has a traffic, wherein the NS partition is an NS partition divided according to carriers and/or regions;
   a filtering module configured to, from local records or a local database, filter out domain name configuration information belonging to the NS partition corresponding to the DNS server; and
   a loading module configured to load the filtered-out domain name configuration information into a memory of the DNS server.

7. The DNS server according to claim 6, further comprising a determining module,
   wherein the determining module is configured to, when any domain name configuration information in the local records or local database is changed, determine whether the changed domain name configuration information belongs to the NS partition corresponding to the DNS server; and
   wherein the loading module is further configured to, when it is determined that the changed domain name configuration information belongs to the NS partition corresponding to the DNS server, load the changed domain name configuration information in the memory of the DNS server.

8. A domain name resolution system comprising the DNS server according to claim 7, further comprising:
a receiving module configured to receive a domain name resolution request; and
a first processing module configured to determine whether domain name configuration information corresponding to the domain name resolution request is stored in the memory of the DNS server and, when the domain name configuration information corresponding to the domain name resolution request is stored in the memory of the DNS server, to resolve the domain name resolution request according to the domain name resolution request.

9. The system according to claim 8, further comprising:
a second processing module configured to, when the domain name configuration information corresponding to the domain name resolution request is stored in a memory of the DNS server, filter out the domain name configuration information corresponding to the domain name resolution request in the local records or database, and resolve the domain name resolution request according to the filtered-out domain name configuration information.

10. A domain name system (DNS) network system, comprising the DNS server according to claim 6.

11. A non-transitory computer-readable storage medium storing computer program instructions executable by at least one processor to perform a domain name resolution method, the method comprising:
dividing at least two NS (name server) partitions according to network carriers and/or regions;
based on an IP address of an DNS server, obtaining an NS partition on which the DNS server has a traffic;
from local records or a local database, filtering out domain name configuration information belonging to the NS partition corresponding to the DNS server; and
loading the filtered-out domain name configuration information into a memory of the DNS server.

12. The non-transitory computer-readable storage medium according to claim 11, the method further comprising:
when any domain name configuration information in the local records or local database is changed, determining whether the changed domain name configuration information belongs to the NS partition corresponding to the DNS server; and
when it is determined that the changed domain name configuration information belongs to the NS partition corresponding to the DNS server, loading the changed domain name configuration information in the memory of the DNS server.

13. The non-transitory computer-readable storage medium according to claim 12, the method further comprising:
receiving a domain name resolution request;
determining whether domain name configuration information corresponding to the domain name resolution request is stored in the memory of the DNS server; and
when it is determined that the domain name configuration information corresponding to the domain name resolution request is stored in the memory of the DNS server, resolving the domain name resolution request according to the domain name configuration information.

14. The non-transitory computer-readable storage medium according to claim 13, the method further comprising:
when it is determined that the domain name configuration information corresponding to the domain name resolution request is not stored in the memory of the DNS server, filtering out the domain name configuration information corresponding to the domain name resolution request from local records or database; and
resolving the domain name resolution request according to the filtered-out domain name configuration information.

15. The non-transitory computer-readable storage medium according to claim 13, wherein determining whether domain name configuration information corresponding to the domain name resolution request is stored in the memory of the DNS server further comprises:
matching an egress IP address of a local DNS server with at least one IP address in an IP database and determining an NS partition corresponding to the egress IP address; and
determining whether domain name configuration information of the domain name resolution request is stored in the memory of the DNS server according to the NS partition and the domain name resolution request.

\* \* \* \* \*